United States Patent
Waggoner

(10) Patent No.: US 12,022,075 B1
(45) Date of Patent: Jun. 25, 2024

(54) SYSTEMS AND METHODS FOR APPLYING A PERCEPTUAL QUANTIZER ELECTRO-OPTICAL TRANSFER FUNCTION TO OPTIMIZE DITHERING AND ADAPTIVE QUANTIZATION FOR NON-PERCEPTUAL QUANTIZER COLOR SPACES

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 390 days.

(21) Appl. No.: 17/537,221

(22) Filed: Nov. 29, 2021

(51) Int. Cl.
   H04N 7/12 (2006.01)
   H04N 19/124 (2014.01)
   H04N 19/154 (2014.01)
   H04N 19/172 (2014.01)
   H04N 19/467 (2014.01)

(52) U.S. Cl.
   CPC ......... H04N 19/124 (2014.11); H04N 19/154 (2014.11); H04N 19/172 (2014.11); H04N 19/467 (2014.11)

(58) Field of Classification Search
   CPC .................................................. H04N 19/124
   See application file for complete search history.

(56) References Cited

U.S. PATENT DOCUMENTS

2014/0169451 A1* 6/2014 Cohen ............... H04N 19/50
375/240.03

* cited by examiner

Primary Examiner — Y Lee
(74) Attorney, Agent, or Firm — NICHOLSON DE VOS WEBSTER & ELLIOTT LLP

(57) ABSTRACT

Techniques for applying a perceptual quantizer (PQ) electro-optical transfer function to optimize dithering and adaptive quantization for non-perceptual quantizer (e.g., SDR) color spaces are described. According to some embodiments, a computer-implemented method includes receiving a request to encode a video comprising a frame having pixels with non-perceptual quantizer code values of luminance at a content delivery service, determining, by the content delivery service, perceptual quantizer code values for the frame based at least in part on the non-perceptual quantizer code values, determining, by the content delivery service, one or more encoding parameters based at least in part on the perceptual quantizer code values, encoding, by the content delivery service, the frame based at least in part on the one or more encoding parameters into an encoded frame, and transmitting the encoded frame from the content delivery service to a viewer device.

20 Claims, 12 Drawing Sheets

SYSTEMS AND METHODS FOR APPLYING A PERCEPTUAL QUANTIZER ELECTRO-OPTICAL TRANSFER FUNCTION TO OPTIMIZE DITHERING AND ADAPTIVE QUANTIZATION FOR NON-PERCEPTUAL QUANTIZER COLOR SPACES

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
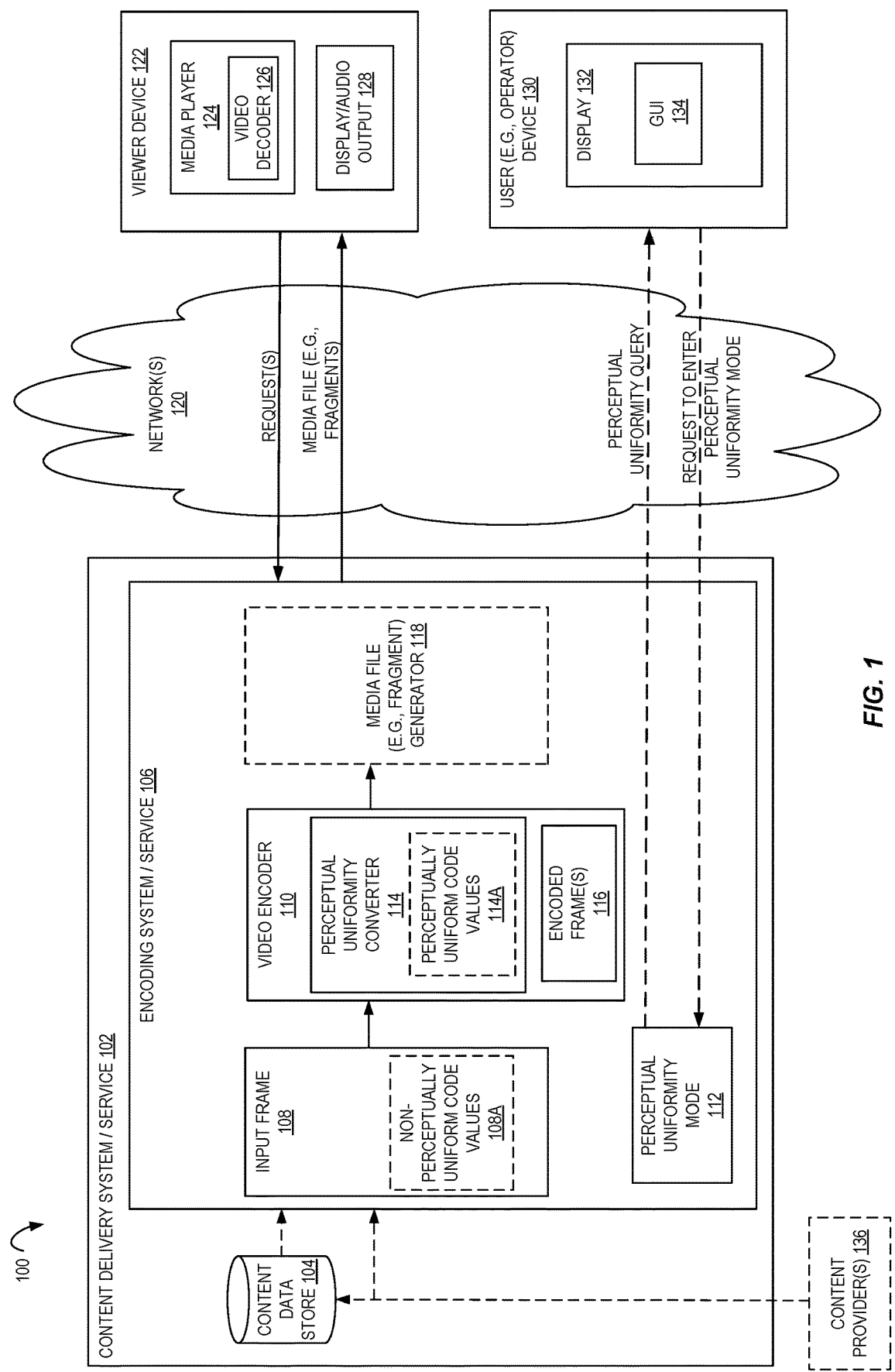
FIG. 1 is a diagram illustrating an environment including a content delivery system/service, having a video encoder including a perceptual uniformity converter, to send the encoded media file to a viewer device according to some embodiments.

The present disclosure relates to methods, apparatus, systems, and non-transitory computer-readable storage media for applying a perceptually uniform (e.g., a perceptual quantizer) electro-optical transfer function (EOTF) to optimize encoding settings (e.g., dithering settings and/or adaptive quantization settings) for non-perceptually uniform (e.g., non-perceptual quantizer) color spaces for image and video (e.g., frame) encoding. In certain embodiments, a content delivery system and/or service receives a request to encode an image (e.g., frame) having pixels with non-perceptually uniform code values (e.g., code levels) (e.g., digital values), determines perceptually uniform code values for the image based at least in part on the non-perceptually uniform code values, determines one or more encoding parameters (e.g., dithering parameters and/or quantization parameters) based at least in part on the perceptually uniform code values, encodes the image (e.g., the non-perceptually uniform code values) based at least in part on the one or more encoding parameters into an encoded image, and transmits the encoded image from the content delivery service to a viewer device. The pixel values may be luminance (e.g., luma component) values.

Certain encoders (e.g., video encoders) assume that the visual value of each code value is consistent, for example, going two code values from a luma value of 16 to 18 is as visible as going two code values from 216 to 218. However, this is an inaccurate assumption for non-perceptually uniform (e.g., non-perceptual quantizer) code values, for example, code values that represent light intensity based on a cathode-ray tube (CRT) display's brightness, contrast, and color characteristics and limits. In certain embodiments, non-perceptually uniform (e.g., non-perceptual quantizer) code values are according to a standard of the International Telecommunication Union (ITU) Radiocommunication Sector (ITU-R), e.g., the Rec. (or BT) 709-6 standard ("Standard Dynamic Range" (SDR)) (e.g., of 2015). Thus, in certain embodiments, non-perceptually uniform (e.g., non-perceptual quantizer) code values have a contrast between similar values near black that is much more visible than similar values near white. A common result of this is loss of shadow detail, blocking, or banding.

Certain displays utilize a transfer function (e.g., Electro-Optical Transfer Function) having the image (e.g., picture) or video signal as an input and convert that into the linear light output of the display (e.g., in nits), for example, where this is done within the display device. In certain embodiments, the EOTF utilized is an exponential (for example, "gamma", e.g., in SDR) EOTF that is not perceptually uniform to a human. The issues caused by using not perceptually uniform EOTFs and/or code values have become even more visible with the introduction of high-definition (e.g., liquid-crystal-display (LCD)) displays, which are less capable of deep blacks than the CRT displays the non-perceptually uniform (e.g., SDR) video standards were based on. In certain embodiments, an opto-electronic transfer function (OETF) is used to convert linear scene light into the video signal, e.g., within a camera.

In certain embodiments, the EOTF used is perceptually uniform to a human, for example, the EOTF is according to a (e.g., high-definition) standard that is based in vision science (for example, and not on the gamma curve, e.g., as in SDR), and thus the resultant code values are perceptually uniform and perceptually spaced. In certain embodiments, this is based on the Barten Curve research which characterized human visual response much more accurately. In certain embodiments, the perceptually uniform EOTF is a perceptual quantizer (PQ) EOTF, e.g., according to the Society of Motion Picture and Television Engineers (SMPTE) standard ST 2084 (e.g., of 2014) and/or the ITU Rec. (BT) 2100 standard (e.g., of 2018). In certain embodiments, the PQ EOTF is capable of representing luminance level up to 10000 candela (of luminance intensity) per square meter ($cd/m^2$) (i.e., "nits") and down to 0.0001 nits.

Certain encoders (e.g., those targeting the Rec.709 or a Hybrid Log Gamma (HLG) EOTF) still ignore the perceptual nonuniformity of those color volumes, or may attempt to use simple "hacky" tweaks not based in clear image science.

Embodiments herein provide for a mode that preserves the psychovisual characteristics of a source having non-perceptually uniform (e.g., non-perceptual quantizer) code values. Embodiments herein allow for the use of perceptually uniform (e.g., perceptual quantizer) science and technology to optimize encoding for non-perceptually uniform (e.g., non-perceptual quantizer) code values (e.g., according to SDR and/or HLG encoding). The same techniques are used to optimize for viewing based on display characteristics and/or viewing conditions in certain embodiments.

Embodiments herein improve the functioning of an encoder by allowing the encoder to determine (e.g., estimate) perceptually uniform code values of an image based at least in part on an input of non-perceptually uniform code values for the image. Certain embodiments herein convert non-perceptually uniform code values (e.g., of a SDR and/or HLG image) into a perceptually uniform (e.g., PQ) space, and thus enable the encoder to determine the nonuniformity of the original (e.g., non-perceptually uniform) EOTF and/or determine the different visibility between those code values versus what they should be psychovisually (e.g., by comparing the number of steps in non-perceptually uniform code values to the number of steps in the corresponding perceptually uniform code values). As one example, for SDR, the encoder can determine that PQ has more steps within a single code value near black (e.g., there is not a one-to-one correspondence), and the PQ is more spread out than SDR near white. From this, the encoder can extrapolate how visible differences are between SDR code values across the EOTF, for example, indicating where the encoder is to encode more precisely, and where the encoder can be less precise without producing any visible loss, e.g., shadow detail, blocking, and/or banding.

In certain embodiments, an encoder is to determine (e.g., estimate) perceptually uniform code values of an image based at least in part on input non-perceptually uniform code values for the image, and then perform a comparison of the non-perceptually uniform code values and the perceptually uniform code values, e.g., to generate a distortion estimation value. In certain embodiments, the encoder is to (e.g., based at least in part on the comparison of the non-perceptually uniform code values and the perceptually uniform code values) control an adaptive quantization (e.g., selection of a quantization parameter (QP)) proportional to the PQ step values, for example, so that the QPs will be lower near black and higher near white, and thus delivering more perceptually uniform results at a given bitrate.

This can be extended to other image processing, such as, but not limited to, dithering. In certain embodiments, converting from 12-bit (or 10-bit) down to 10-bit or 8-bit SDR requires a good dithering strategy to avoid banding. But this itself adds noise. In certain embodiments, the encoder is to (e.g., based at least in part on the comparison of the non-perceptually uniform code values and the perceptually uniform code values) control dithering proportional to the PQ step values, e.g., by using the PQ stepping, the encoder varies its dithering strategy across the luma range. In certain embodiments, (e.g., very careful) randomization and noise reduction is applied to near-black, e.g., to avoid introducing visible details that are not present in the source. In certain embodiments, averaging, truncation, and/or aggressive noise reduction is applied near white where the differences between adjacent SDR code values is invisible. In certain embodiments, this makes near-black somewhat more complex to encode, but this is balanced out by making near-white easier to encode, again providing a more perceptually uniform experience at a given bitrate.

In certain embodiments, the perceptually uniform (e.g., PQ) EOTF is display-referenced such that each pixel's code value has a specific nits value to be displayed at, but non-perceptually uniform (e.g., SDR and HLG) code values are scene-referenced such that performance is defined relatively (e.g., as a percentage of maximum brightness instead of a nit value). This property allows an encoder to perform a perceptually uniform (e.g., PQ) code values versus non-perceptually uniform (e.g., SDR and HLG) code values evaluation and parameterization based on the different ways the (e.g., SDR or HLG) image would be displayed. For example, a video having non-perceptually uniform (e.g., SDR) code values would be modeled differently by the encoder presuming peak white was shown at 100 nits versus 400 nits. That would put the non-perceptually uniform (e.g., SDR) EOTF code values at different points in the perceptually uniform (e.g., PQ) curve, which would change the impact of adjoining luma levels in the original EOTF. Certain embodiments of encoders herein model displays that have elevated blacks, so that the non-perceptually uniform (e.g., SDR) black code values would start higher up on the perceptually uniform (e.g., PQ) EOTF. Embodiments herein thus allow for new and arbitrary display properties to be modeled in real time. Embodiments herein thus allow for encoding parameters to be tuned in real time.

In certain embodiments, the determining (e.g., estimating) of perceptually uniform code values of an image based at least in part on an input of non-perceptually uniform code values for the image does not include a conversion from code values to (e.g., floating point) linear light (e.g., in nits), as that is very computationally expensive. Certain embodiments herein instead utilize a data structure's mapping of non-perceptual quantizer code values to perceptual quantizer code values, e.g., allowing for a look up for the given (e.g., particular) EOTF (e.g., and modeled display). In certain embodiments, a data structure is populated (e.g., before the look up) by determining corresponding brightness values (e.g., in nits) from the non-perceptually uniform code values by a non-perceptually uniform electro-optical transfer function, determining the perceptually uniform code values from the corresponding brightness values by a perceptually uniform electro-optical transfer function, and storing a mapping of the non-perceptually uniform code values to the perceptually uniform code values in a data structure of the content delivery service.

Certain content (e.g., video and/or image) is encoded (e.g., by an encoding system/service) from a source format having a first width of pixels values (e.g., 10-bits deep) to a deliverable format having a second, different width of pixel values (e.g., 8-bits deep). For example, with a 10-bits deep (binary) number having 1024 possible values, but an 8-bits deep (binary) number having 256 possible values. In certain embodiments, fewer than all values are utilized, e.g., 8-bits deep pixel values may be within a given range, for example, from 16 (e.g., "full black") to 235 (e.g., "full white"). However, the conversion from the source format having a first width of pixels values (e.g., 10-bits deep) to the deliverable format having a second, different width of pixel values (e.g., 8-bits deep) has large enough jumps that a seam can be seen between areas of pixels just one pixel value apart in certain embodiments. So, instead of truncating certain (e.g., 2) least significant bits of the (e.g., 10-bits) source, dithering algorithms are used in certain embodiments.

Various techniques for dithering exist. In certain embodiments, dithering is performed before any quantization (or re-quantization) process, in order to de-correlate the quantization noise from the input signal and to prevent non-linear behavior (e.g., distortion). In certain embodiments, quantization with lesser bit depth requires higher amounts of dither. In certain embodiments, the result of the process still yields distortion, but the distortion is of a random nature, so the resulting noise is, effectively, de-correlated from the intended signal. The disclosure herein is applicable to both images and video.

Feedback from the encoder, for example in a quantization step, may be used to drive making optimally efficient choices for encoding. For example, using the same dithering pattern in the same or different locations on the frame may serve as more efficient predictors for future frames.

The examples herein generally discuss a luma component of a set of color space components, but it should be understood that the disclosure herein is applicable to other components of the set of color space components (e.g., chrominance components, such as, but not limited to, blue chrominance and red chrominance).

For example, "YUV" is a color space (e.g., color encoding scheme) that may be used as part of a color image pipeline. In certain embodiments, the selected color space encodes a color image or video taking human perception into account, allowing reduced bandwidth for chrominance components, and generally enabling transmission errors or compression artifacts to be more efficiently masked by the human perception than using a "direct" red green blue (RGB) representation. A color space may encode brightness information (e.g., luma component Y) separately from color information (e.g., chrominance components U and V). YUV may be used as a general term encompassing (i) YUV-analog phase alternating line (PAL) encoding, (ii) YIQ-analog national television system committee (NTSC) encoding, and (iii) YCbCr-digital encoding.

Original black and white TV was broadcast by transmitting an analog signal representing just the luminance of the image. When color was introduced into television, the black and white luma system was not just thrown away. Chrominance (or color) information (e.g., designated as U and V) was added separately via a sub-carrier so that a black-and-white receiver would still be able to receive and display a color picture transmission in the receiver's native black-and-white format. In certain embodiments, U and V components provide color information and are color difference signals of blue minus luma (e.g., B-Y) and red minus luma (e.g., R-Y).

In certain embodiments, Y prime (Y') generally refers to a gamma compressed luminance Y (e.g., Y' being referred to as the "luma" component) (the brightness) and U and V are the chrominance (color) components, e.g., with "luminance" Y referring to physical linear-space brightness, while "luma" Y' referring to (e.g., non-linear) perceptual brightness.

In certain embodiments, a YPbPr color space is used in analog component video and its digital version YCbCr is used in digital video, e.g., where Cb/Pb and Cr/Pr are deviations from grey on blue-yellow and red-cyan axes, respectively, whereas U and V are blue-luminance and red-luminance differences, respectively.

A video encoder herein may operate according to a video encoding standard. In certain embodiments, the video encoding standard is an Advanced Video Coding (AVC) standard, for example, an H.264 standard, an H.265 standard, an H.266 standard, or an AV1 standard. In certain embodiments, the encoding itself is according to a non-perceptually uniform encoding (e.g., an SDR encoding), for example, with the encoding performed only on the non-perceptually uniform code values (e.g., the encoding not being performed on perceptually uniform code values).

FIG. 1 is a diagram illustrating an environment 100 including a content delivery system/service 102, having a video encoder 110 including a perceptual uniformity converter 114, to send the encoded media file to a viewer device according to some embodiments. In certain embodiments, video encoder 110 is to determine (e.g., convert) perceptually uniform code values 114 of an input frame 108 based at least in part on an input of non-perceptually uniform code values 108A for the input frame 108. In certain embodiments, the non-perceptually uniform code values 108A are code value according to a non-perceptually uniform (e.g., non-perceptual quantizer (non-PQ)) (e.g., SDR) standard. Encoding system/service 106 may operate in accordance with a video encoding standard.

Encoding may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In certain embodiments, each single I-frame includes a plurality of inter-coded frames (e.g., P-frames and/or B-frames), e.g., as a group of pictures (GOP).

In certain embodiments, encoding system/service 106 (e.g., video encoder 110) includes a perceptual uniformity converter 114 according to this disclosure. In certain embodiments, perceptual uniformity converter 114 is to determine (e.g., convert) perceptually uniform code values 114 of an input frame 108 based at least in part on an input of non-perceptually uniform code values 108A for the input frame 108. In certain embodiments, video encoder 110 is to perform a comparison (e.g., on a frame by frame, block by block, pixel by pixel, etc. basis) of the non-perceptually uniform code values 108A and the perceptually uniform code values 114A, e.g., to generate a distortion estimation value. In certain embodiments, video encoder 110 is to determine one or more encoding parameters based on the comparison (e.g., on a frame by frame, block by block, etc. basis) of the non-perceptually uniform code values 108A and the perceptually uniform code values 114A, e.g., the distortion estimation value. In certain embodiments, a change of two "steps" of non-perceptually uniform code values (e.g., black code values) is determined to be more than two "steps" in the corresponding perceptually uniform code values, e.g., and the encoder 110 thus is to devote more encoding resources (e.g., encoding bits) to the encoding of those block(s) of the input frame 108.

Embodiments herein provide for a mode 112 that preserves the psychovisual characteristics of the source.

An encoding algorithm (e.g., specified by a video encoding standard) may select between inter and intra coding for (e.g., block-shaped) regions of each picture (e.g., frame 108). In certain embodiments, inter coding (e.g., as indicated by an "inter" mode) uses motion vectors for (e.g., block-based) inter prediction from other pictures (e.g., frames) to exploit temporal statistical dependencies between different pictures. Reference pictures (e.g., reference frames) may be stored in a reference picture buffer in encoding system/service 106. In certain embodiments, intra coding uses various spatial predictions to exploit spatial statistical dependencies in the source signal for a single picture (e.g., frame). In certain embodiments, motion vectors and intra prediction modes are specified for a variety of block sizes in the picture. In certain embodiments, the prediction residual is then further compressed using a transform to remove spatial correlation inside the transform block before it is quantized, producing an irreversible process that typically discards less important visual information while forming a close approximation to the source samples. In certain embodiments, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode. An inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform. An intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

In certain embodiments, the encoding is performed (e.g., only) on the non-perceptually uniform code values 108A to generate encoded frame(s) 116, e.g., with the perceptually uniform code values 114A (e.g., only) used to control the encoding and/or selecting of encoding parameters, but the perceptually uniform code values 114A are not encoded into encoded frame(s) 116.

In certain embodiments, encoding system/service 106 includes a field, that when set, causes entry to perceptual uniformity mode 112. In certain embodiments, storing a first value into field for perceptual uniformity mode 112 causes the perceptual uniformity converter 114 to determine (e.g., estimate) perceptually uniform code values of an image based at least in part on input non-perceptually uniform code values for the image, and then determine one or more encoding parameter based on those results. In certain embodiments, storing a first value into field for perceptual uniformity mode 112 causes the perceptual uniformity converter 114 to determine (e.g., estimate) perceptually uniform code values of an image based at least in part on input non-perceptually uniform code values for the image (e.g., on a pixel by pixel basis), and then (e.g., the encoder 110 to) perform (e.g., on a pixel by pixel basis) a comparison of the non-perceptually uniform code values and the perceptually uniform code values, e.g., to generate a distortion estimation value (e.g., such that when it has higher value that indicates there is more distortion than at a lower value). In certain embodiments, the encoder 110 is to (e.g., based at least in part on the comparison of the non-perceptually uniform code values and the perceptually uniform code values) control the encoding (e.g., with the encoding performed only on the non-perceptually uniform code values 108A, or a filtered version thereof), for example, by controlling the (i) adaptive quantization (e.g., selection of a quantization parameter (QP)) proportional to the PQ step values, for example, so that the QPs will be lower near black and higher near white, and thus delivering more perceptually uniform results at a given bitrate, and/or (ii) dithering. In certain embodiments, the dithering occurs before encoding.

In certain embodiments, the quantization parameter (QP) is an encoder value (e.g., setting) that sets the amount of compression for a corresponding block (e.g., macroblock) in a frame, for example, with a large QP value indicating that there will be higher quantization by encoder (e.g., quantizer thereof), and thus more compression and lower quality, and a lower QP value indicating the opposite. In certain embodiments, the possible QP values range from 0 to 51, e.g., according to a (e.g., H.264 or H.265) video encoding (e.g., compression) standard. In certain embodiments, the QP for a first block in a frame is different than the QP for a second block in the frame.

The depicted content delivery system/service 102 includes a content data store 104, which may be implemented in one or more data centers. In certain embodiments, the media file (e.g., video file that is to be viewed by the viewer device 122) is accessed (for example, from the content data store 104 or directly from a content provider 136, e.g., as a live stream) by video encoder 110 (e.g., by media file (e.g., fragment) generator 118). In certain embodiments, the (e.g., client) viewer device 122 requesting the media file (e.g., fragment(s) of media) from content delivery system/service 102 causes the encoding system/service 106 (e.g., video encoder 110 thereof) to encode the video file, e.g., into a compressed format for transmittal on network(s) 120 to viewer device 122. In certain embodiments, the media file generator 118 generates one or more subsets (e.g., frames, fragments, segments, scenes, etc.) of the media file (e.g., video), e.g., beginning with accessing the media file and generating the requested media (e.g., fragment(s)). In certain embodiments, each fragment includes a plurality of video frames.

In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., and perceptual uniformity converter 114 system/service thereof) is to send a query (e.g., asking if the "perceptual uniformity" mode 112 is desired) to user (e.g., operator) device 130, for example, and the user device 130 (e.g., in response to a command from a user of the device 130) is to send a response (e.g., an indication to enter or not enter "perceptual uniformity" mode 112). Depicted user device 130 includes a display 132 having a graphical user interface (GUI) 134, e.g., to display a query for encoding system/service 106 to enter (or not) perceptual uniform mode 112.

Depicted viewer device 122 (e.g., where the viewer is a customer of user (e.g., operator) of device 130) includes a media player 124 having a video decoder 126 to decode the media file (e.g., fragment) from the content delivery system/service 102, e.g., to display video and/or audio of the media file on display and/or audio output 128, respectively.

Figure 2:
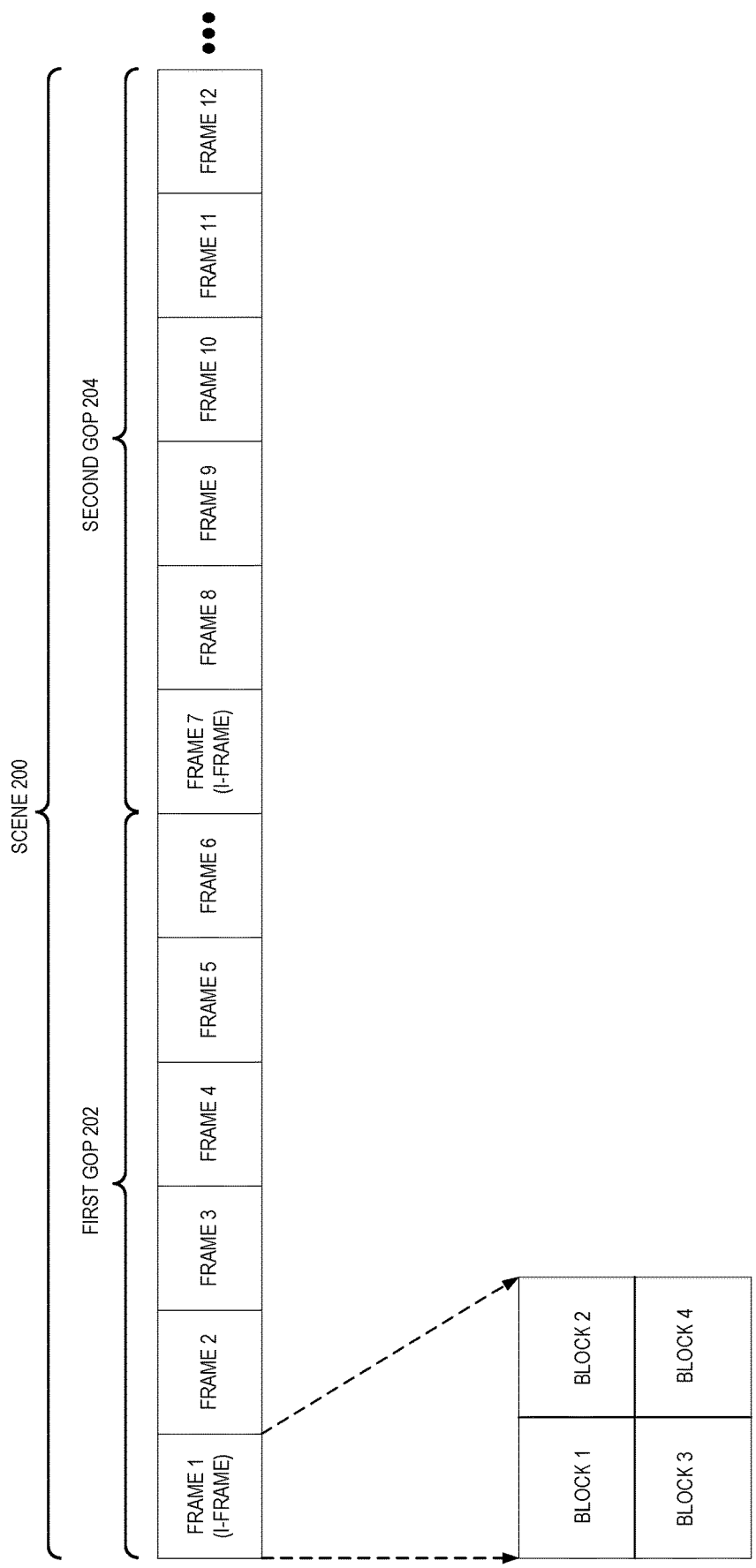
FIG. 2 is a diagram illustrating a scene having a plurality of groups of pictures, and a frame formed from a plurality of blocks (e.g., macroblocks) according to some embodiments.

FIG. 2 is a diagram illustrating a scene having a plurality of groups of pictures, and a frame formed from a plurality of blocks (e.g., macroblocks) according to some embodiments.

FIG. 2 is a diagram illustrating a scene 200 having a plurality of groups of pictures 202, 204, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In some embodiments, a macroblock is a proper subset of pixels of a frame used as the basic processing unit of the video encoding/decoding. An example macroblock is a (e.g., 16×16) block of (e.g., 256) luma samples and two corresponding blocks of chroma samples. A macroblock can be further partitioned for inter prediction. In certain embodiments, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously decoded pictures (e.g., reference frame(s)). In certain embodiments, motion vectors are encoded differentially with respect to predicted values formed from nearby encoded motion vectors. In certain embodiments, an encoder calculates appropriate motion vectors and other data elements represented in the video data stream. This motion estimation process in the encoder and/or the selection of whether to use inter prediction for the representation of each region of the video content may be specified by an encoding standard.

In certain embodiments, each pixel value in a frame is converted from a first format (e.g., corresponding to a value scale of a given bit width) to a second, different format (e.g., corresponding to a different value scale of a different, given bit width), for example, pixel values converted from 10-bit deep values to 8-bit deep values.

Figure 3:
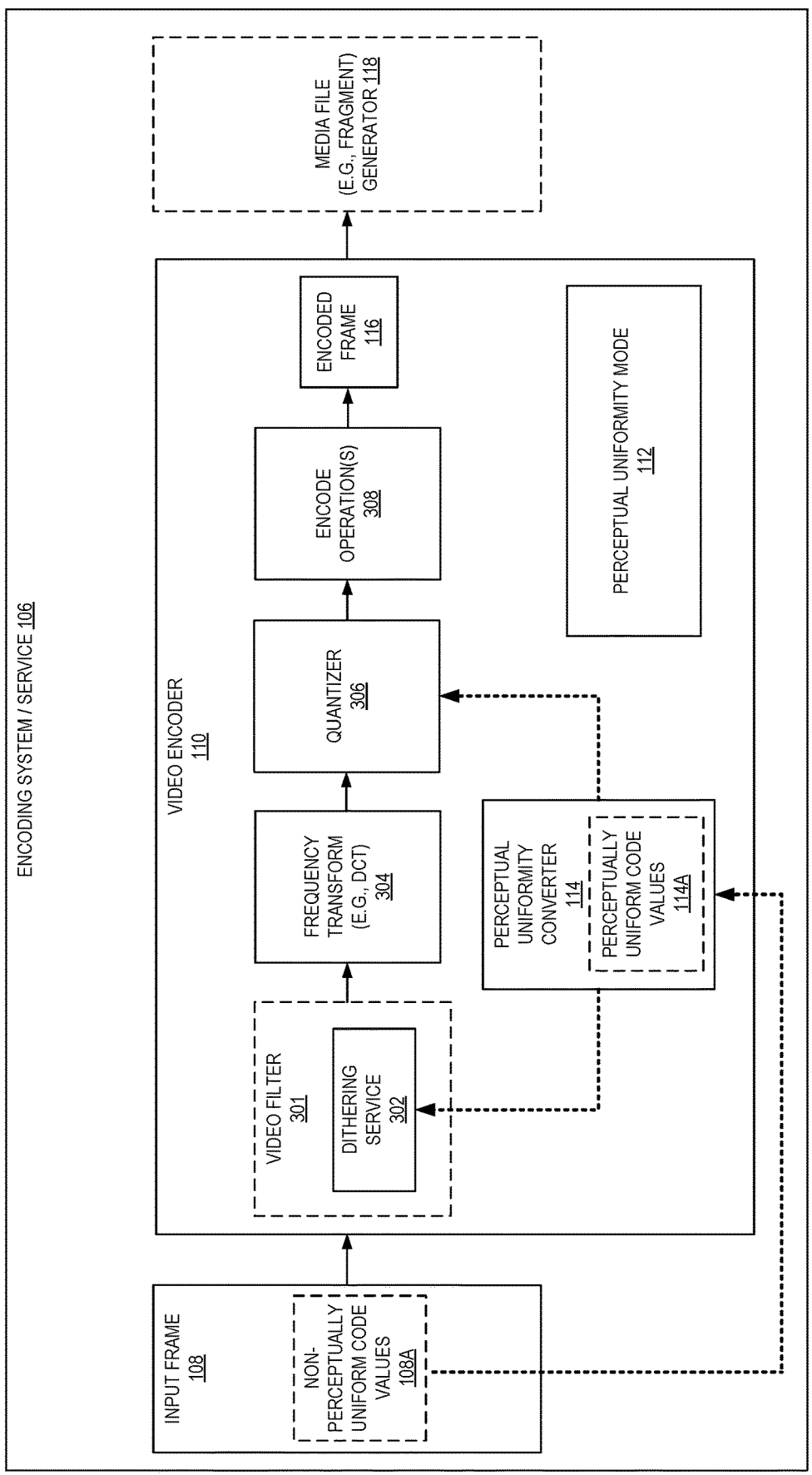
FIG. 3 is a diagram illustrating a video encoder with a perceptual uniformity converter and a perceptual uniformity mode according to some embodiments.

FIG. 3 is a diagram illustrating a video encoder 110 with a perceptual uniformity converter 114 and a perceptual uniformity mode 112 according to some embodiments. Depicted video encoder 110 includes a video filter 301 (which may include dithering service 302). In certain embodiments, dithering service 302 is to dither certain pixel values of input frame 108 (e.g., and not dither other pixel values of input frame 108), for example, after converting of pixel values of input frame 108 from a source format (e.g., 10-bits deep) to an output format (e.g., 8-bits deep). In certain embodiments, this conversion (e.g., and any dithering by dithering service 302) occurs before encoding.

Video filter 301 may cause a reduction in data, e.g., to filter an image (e.g., macroblock thereof) with different sub sampling (e.g., chroma sub sampling in a (e.g., YCbCr) color space). For example, subsampling formats known as 4:4:4, 4:2:2, and 4:2:0 video, where 4:4:4 is full bandwidth Y:Cb:Cr video (respectively) and each macroblock consists of 4 Y blocks, 4 Cb blocks, and 4 Cr blocks, 4:2:2 containing half as much chrominance information as 4:4:4, and 4:2:0 containing one quarter of the chrominance information.

In certain embodiments herein, a subsampled or non-subsampled value is converted from a first format (e.g., corresponding to a value scale of a given bit width) to a second, different format (e.g., corresponding to a different value scale of a different, given bit width), for example, pixel values converted from 10-bit deep values to 8-bit deep values. In certain embodiments, dithering service 302 performs dithering before actual encoding (e.g., before encode operations(s) 308). In certain embodiments, the pixel values 108A output from video filter 301 are input into frequency transform 304 component that performs an invertible transform to concentrate randomness into fewer, decorrelated parameters, e.g., the discrete cosine transform (DCT). In certain embodiments, the output from frequency transform 304 is quantized by quantizer 306 component (e.g., according to corresponding quantization parameter(s)). In certain embodiments, the output from the quantizer 306 is then encoded by encoding operation(s) 308 to generate encoded frame 116.

In certain embodiments, the video encoder 110 (e.g., when set into perceptual uniformity mode 112) is to determine (e.g., estimate) perceptually uniform code values 114A of the frame 108 based at least in part on input non-perceptually uniform code values 108A for the frame 108, and then perform a comparison of the non-perceptually uniform code values and the perceptually uniform code values, e.g., to generate a distortion estimation value. In certain embodiments, the encoder is to (e.g., based at least in part on the comparison of the non-perceptually uniform code values and the perceptually uniform code values) controls one or more encoding parameters, for example, controlling the selection of one or more quantization parameters to be used by quantizer 306 (e.g., selection of a QP proportional to the PQ step values, for example, so that the QPs will be lower near black and higher near white) and/or controlling the selection of one or more dithering parameters to be used by dithering service 302 (e.g., for adjoining pixels (e.g., 10 bit values of a 12 bit to 10 bit conversion), determining if the difference between those pixels is visible in perceptually uniform (e.g., PQ) space, and if so, dither it so that difference is less visible or not visible).

Although the above discusses utilizing the perceptually uniform code values 114A of the frame 108 based at least in part on input non-perceptually uniform code values 108A for the frame 108 (e.g., or the comparison of the non-perceptually uniform code values and the perceptually uniform code values) to control the dithering service 302 and the quantizer 306, it should be understood that other parameters of the video encoder 110 may be controlled based on the perceptually uniform code values 114A of the frame 108 determined from an input non-perceptually uniform code values 108A for the frame 108 (e.g., or the comparison of the non-perceptually uniform code values and the perceptually uniform code values).

Figure 4:
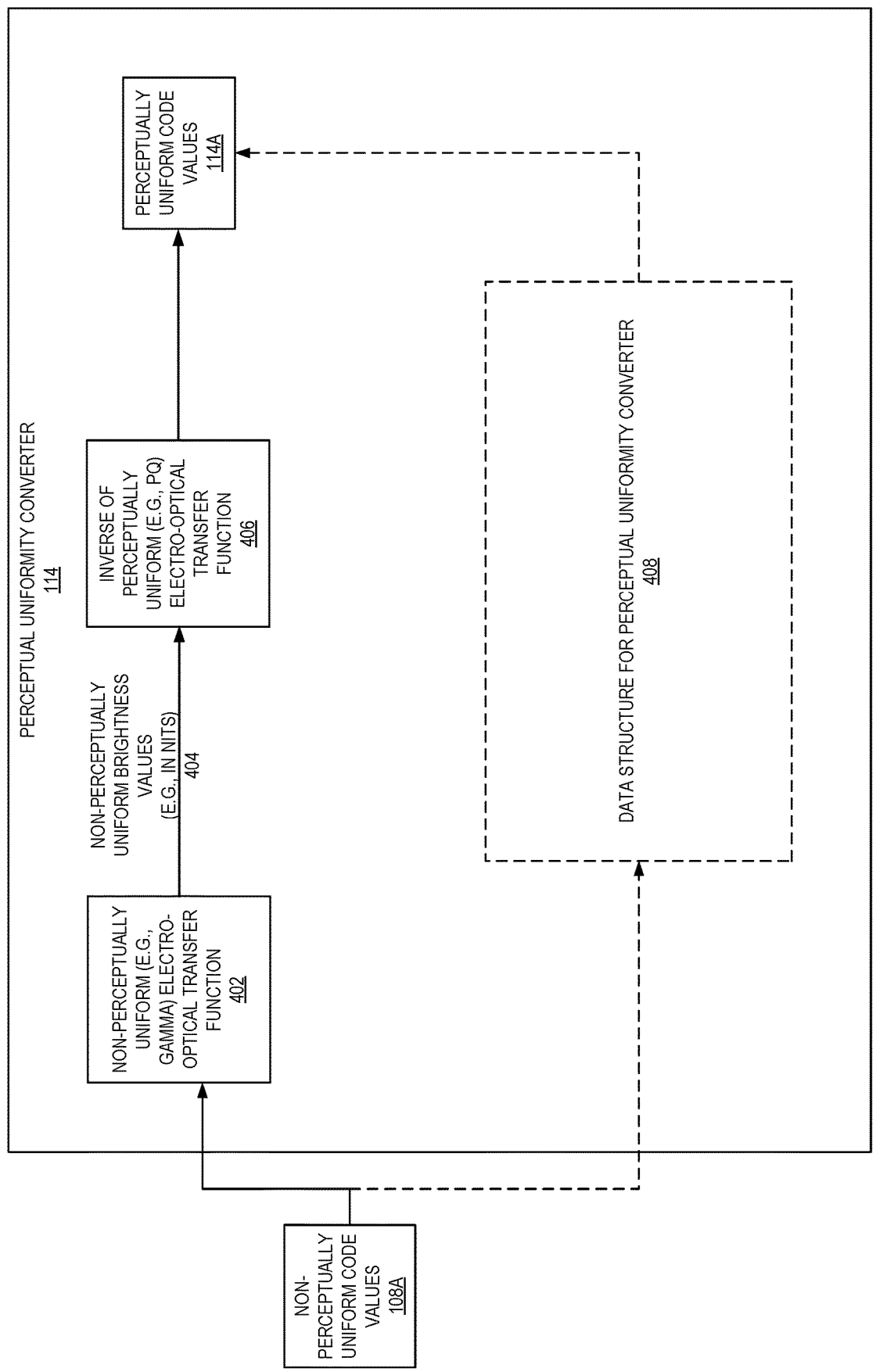
FIG. 4 is a diagram illustrating a perceptual uniformity converter according to some embodiments.

FIG. 4 is a diagram illustrating a perceptual uniformity converter 114 according to some embodiments. In certain embodiments, the non-perceptually uniform code values 108A are input into a non-perceptually uniform (e.g., gamma) EOTF 402 (e.g., selected for a display that is to be modeled) that produces a resulting non-perceptually uniform brightness value 404 (e.g., in nits). In certain embodiments, the non-perceptually uniform brightness value 404 (e.g., in nits) is input into an inverse of a perceptually uniform (e.g., PQ) EOTF 406 to generate perceptually uniform code values 114A. In certain embodiments, an EOTF that is designed to be used by a viewer device 122 (e.g., display 128) is instead used on the encoding system/service 106 to enable perceptual uniformity mode disclosed herein, for example, non-perceptually uniform (e.g., gamma) EOTF 402 and/or inverse of a perceptually uniform (e.g., PQ) EOTF 406.

In certain embodiments, the resultant mapping of the perceptually uniform code value(s) 114A to non-perceptually uniform code value(s) 108A is stored in a data structure 408 (e.g., table) (e.g., populated before the encoding), for example, that outputs a corresponding perceptually uniform code value(s) 114A for an input of non-perceptually uniform code value(s) 108A, e.g., and an input of the EOTF for the code value(s) 108A and/or the modeled display (e.g., the maximum brightness and/or minimum brightness of that modeled display). In certain embodiments, the modeled display (e.g., selected for that encoding) is chosen based on a particular environment that the encoded image (e.g., encoded video) is to be displayed. For example, the modeled display (e.g., its settings) may be chosen based on (e.g., a likelihood of) displaying in an indoor environment (e.g., with a certain level of ambient light) or an outdoor environment (e.g., with a higher level of ambient light).

In certain embodiments, the perceptual uniformity converter 114 functions as shown in FIG. 4 (e.g., according to the bolded path or the dotted path) without performing a linear light scaling (e.g., in floating-point values) of non-linear light (e.g., integer) values (e.g., of luminance) (e.g., non-linear light values that are encoded according to a High Dynamic Range (HDR) standard). In certain embodiments, scaling services are to convert the non-linear light (e.g., integer) values (e.g., of luminance) into linear light (e.g., floating-point) values. One example of this is converting the original integer components of a first (e.g., non-linear light) color space (e.g., 10-bits for each of a luminance and two chrominance components (e.g., in [4:2:0] compression, where the 4 is the width of a block of pixels, the 2 is the number indicating how many pixels are taken from the top row of the original block, and 0 is the number indicating how many pixels are taken from the bottom row of the original block) for a total of 30 bits per pixel) to floating-point (e.g., 32-bit floating-point) values for each component of a second (e.g., linear light) color space (e.g., 32 bits each for R, G, B, and Alpha components for a total of 128 bits per pixel), and then converted back to integer components of a first (e.g., non-linear light) color space (e.g., 10-bit [4:2:0]). Such actions are computationally, temporally, and memory bandwidth expensive. Certain embodiments herein thus improve the functioning of the encoder by avoiding performing those numerous conversions, e.g., for a frame having 10s, 100s, 1000s, etc. of pixels to process.

Figure 5:
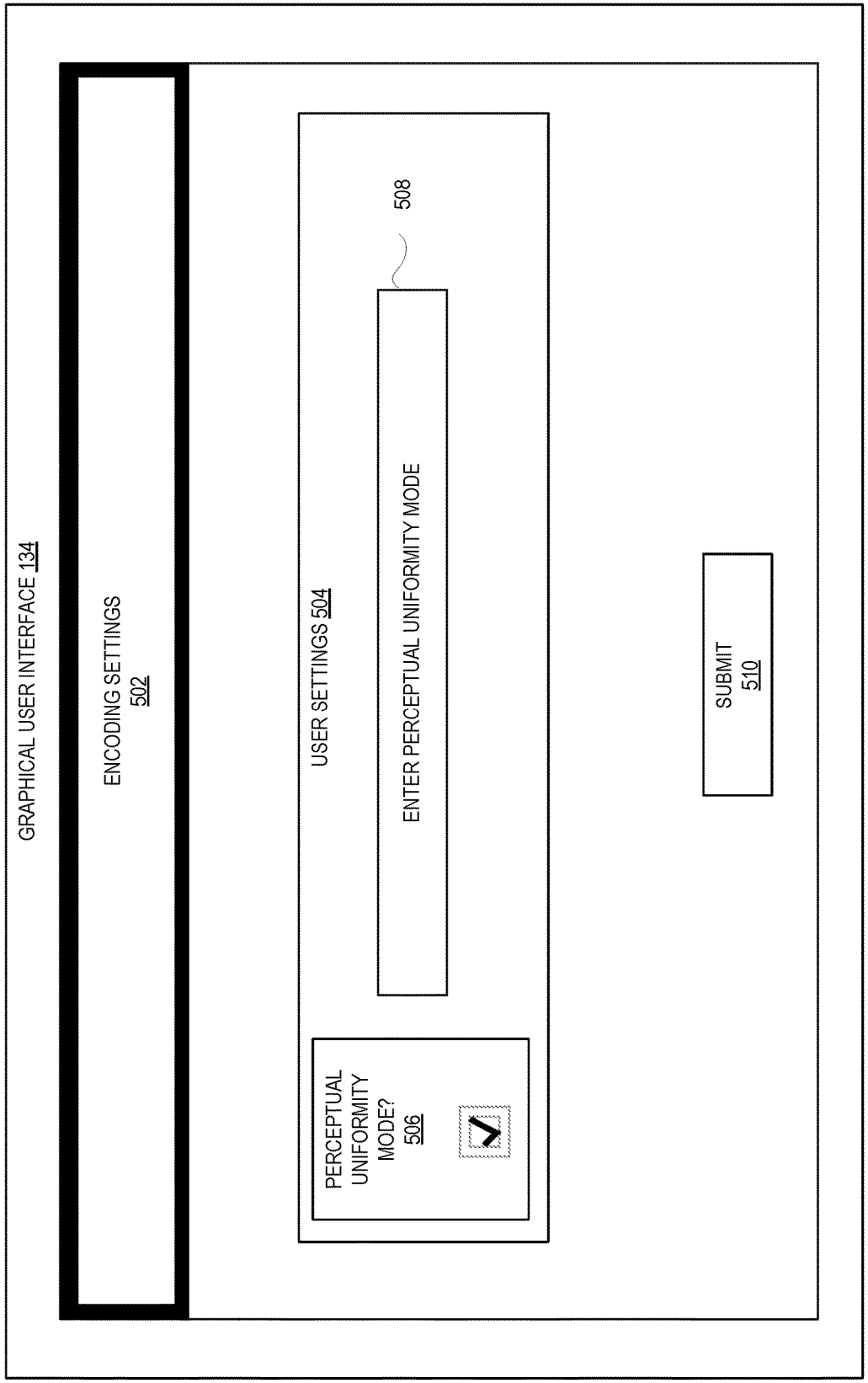
FIG. 5 is a diagram illustrating a graphical user interface for setting an encoder to a perceptual uniformity mode according to some embodiments.

FIG. 5 is a diagram illustrating a graphical user interface 134 for setting an encoder to a perceptual uniformity mode 114 according to some embodiments. Depicted graphical user interface 134 includes a field 502 that is customizable with text to indicate that these are encoding settings, a field 504 that is customizable with text to indicate that these are video (or image) encoding settings, an interface element 506 that, when selected, will cause the content delivery system/service to enter perceptual uniformity mode 114, and a field 508 that is customizable with text to indicate that selecting the interface element 506 is to cause entry into perceptual uniformity mode. A user may click the submit interface element 510 to (e.g., cause a command to be sent that causes) entry of a content delivery system/service into perceptual uniformity mode (e.g., perceptual uniformity mode 114 in FIGS. 1, 3, and 6). An interface element, may include, but is not limited to, a thumbs up (or down), checkbox, button, dropdown menu, etc.

Figure 6:
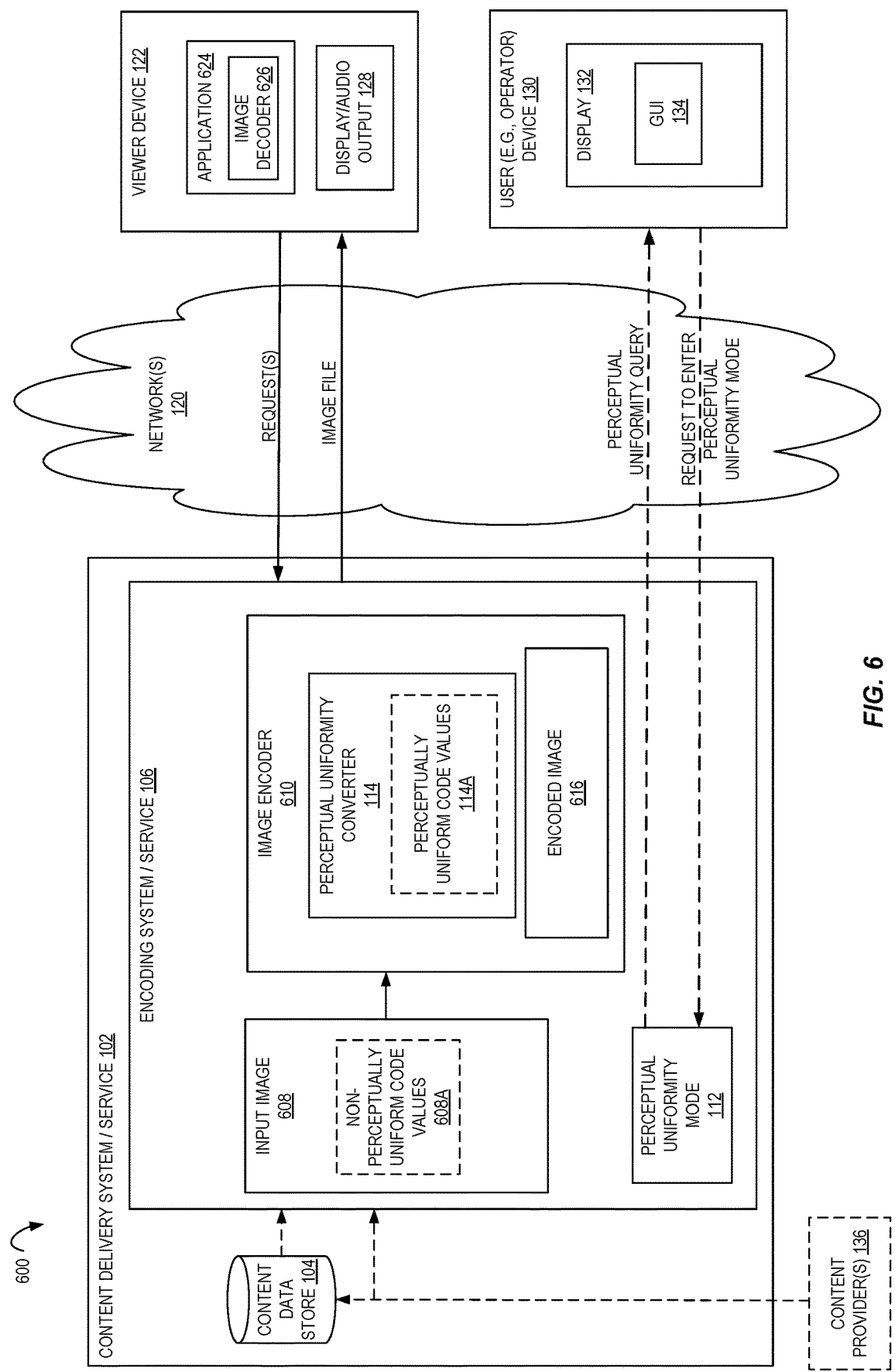
FIG. 6 is a diagram illustrating an environment including a content delivery system/service, having an image encoder including a perceptual uniformity converter, to send the encoded image to a viewer device according to some embodiments.

FIG. 6 is a diagram illustrating an environment 600 including a content delivery system/service 102, having an image encoder 610 including a perceptual uniformity converter 114, to send the encoded image 616 to a viewer device according to some embodiments. In certain embodiments, image encoder 610 is to determine (e.g., convert) perceptually uniform code values 114 of an input image 608 based at least in part on an input of non-perceptually uniform code values 608A for the input image 608. In certain embodiments, the non-perceptually uniform code values 608A are code value according to a non-perceptually uniform (e.g., non-perceptual quantizer (non-PQ)) standard. Encoding system/service 106 may operate in accordance with an image encoding standard.

Encoding may compress an image file 608 into a compressed image 616.

In certain embodiments, encoding system/service 106 (e.g., image encoder 610) includes a perceptual uniformity converter 114 according to this disclosure. In certain embodiments, perceptual uniformity converter 114 is to determine (e.g., convert) perceptually uniform code values 114 of an input image 608 based at least in part on an input of non-perceptually uniform code values 608A for the input image 608. In certain embodiments, image encoder 610 is to perform a comparison (e.g., on an image by image, block by block, etc. basis) of the non-perceptually uniform code values 608A and the perceptually uniform code values 114A, e.g., to generate a distortion estimation value. In certain embodiments, image encoder 610 is to determine one or more encoding parameters based on the comparison (e.g., on an image by image, block by block, etc. basis) of the non-perceptually uniform code values 608A and the perceptually uniform code values 114A, e.g., the distortion estimation value. In certain embodiments, a change of two "steps" of non-perceptually uniform code values (e.g., black code values) is determined to be more than two "steps" in the corresponding perceptually uniform code values, e.g., and the encoder 610 thus is to devote more encoding resources (e.g., encoding bits) to the encoding of those block(s) of the input image 608.

Embodiments herein provide for a mode 112 that preserves the psychovisual characteristics of the source.

In certain embodiments, encoding system/service 106 includes a field, that when set, causes entry to perceptual uniformity mode 112. In certain embodiments, storing a first value into field for perceptual uniformity mode 112 causes the perceptual uniformity converter 114 to determine (e.g., estimate) perceptually uniform code values of an image based at least in part on input non-perceptually uniform code values for the image, and then determine one or more encoding parameter based on those results. In certain embodiments, storing a first value into field for perceptual uniformity mode 112 causes the perceptual uniformity converter 114 to determine (e.g., estimate) perceptually uniform code values of an image based at least in part on input non-perceptually uniform code values for the image, and then (e.g., the encoder 610 to) perform a comparison of the non-perceptually uniform code values and the perceptually uniform code values, e.g., to generate a distortion estimation value (e.g., such that when it has higher value that indicates there is more distortion than at a lower value). In certain embodiments, the distortion estimation value is a distortion metric calculated in the perceptually uniform (e.g., PQ) space. In certain embodiments, the distortion estimation value is a peak signal-to-noise ratio (PSNR) value (e.g., between the non-perceptually uniform code values and the perceptually uniform code values), a sum of the absolute differences (e.g., between the non-perceptually uniform code values and the perceptually uniform code values), or a Hadamard transform. In certain embodiments, the encoder 610 is to (e.g., based at least in part on the comparison of the non-perceptually uniform code values and the perceptually uniform code values) control the encoding, e.g., by controlling the (i) adaptive quantization (e.g., selection of a quantization parameter (QP)) proportional to the PQ step values, for example, so that the QPs will be lower near black and higher near white, and thus delivering more perceptually uniform results at a given bitrate, and/or (ii) dithering. In certain embodiments, the dithering occurs before encoding.

In certain embodiments, the quantization parameter (QP) is an encoder value that sets the amount of compression for every block (e.g., macroblock) in an image, for example, with a large QP value indicating that there will be higher quantization by encoder (e.g., quantizer thereof), and thus more compression and lower quality, and a lower QP value indicating the opposite. In certain embodiments, the possible QP values range from 0 to 51, e.g., according to a (e.g., H.264 or H.265) image encoding (e.g., compression) standard. In certain embodiments, the QP for a first block in an image is different than the QP for a second block in the image.

The depicted content delivery system/service 102 includes a content data store 104, which may be implemented in one or more data centers. In certain embodiments, the media file (e.g., image file that is to be viewed by the viewer device 122) is accessed (for example, from the content data store 104 or directly from a content provider 136) by image encoder 610. In certain embodiments, the (e.g., client) viewer device 122 requesting the media file (e.g., fragment(s) of media) from content delivery system/service 102 causes the encoding system/service 106 (e.g., image encoder 610 thereof) to encode the image file, e.g., into a compressed format for transmittal on network(s) 120 to viewer device 122.

In FIG. 6, content delivery system/service 102 is coupled to viewer device 122 and user device 130 via one or more networks 120, e.g., a cellular data network or a wired or wireless local area network (WLAN).

In certain embodiments, content delivery system/service 102 (e.g., and perceptual uniformity converter 114 system/service thereof) is to send a query (e.g., asking if the "perceptual uniformity" mode 112 is desired) to user (e.g., operator) device 130, for example, and the user device 130 (e.g., in response to a command from a user of the device 130) is to send a response (e.g., an indication to enter or not enter "perceptual uniformity" mode 112). Depicted user device 130 includes a display 132 having a graphical user interface (GUI) 134, e.g., to display a query for encoding system/service 106 to enter (or not) perceptual uniform mode 112. Depicted viewer device 122 (e.g., where the viewer is a customer of user (e.g., operator) of device 130) includes a (e.g., software) application 624 having an image decoder 626 to decode the encoded image from the content delivery system/service 102, e.g., to display the image on display 128.

Figure 7:
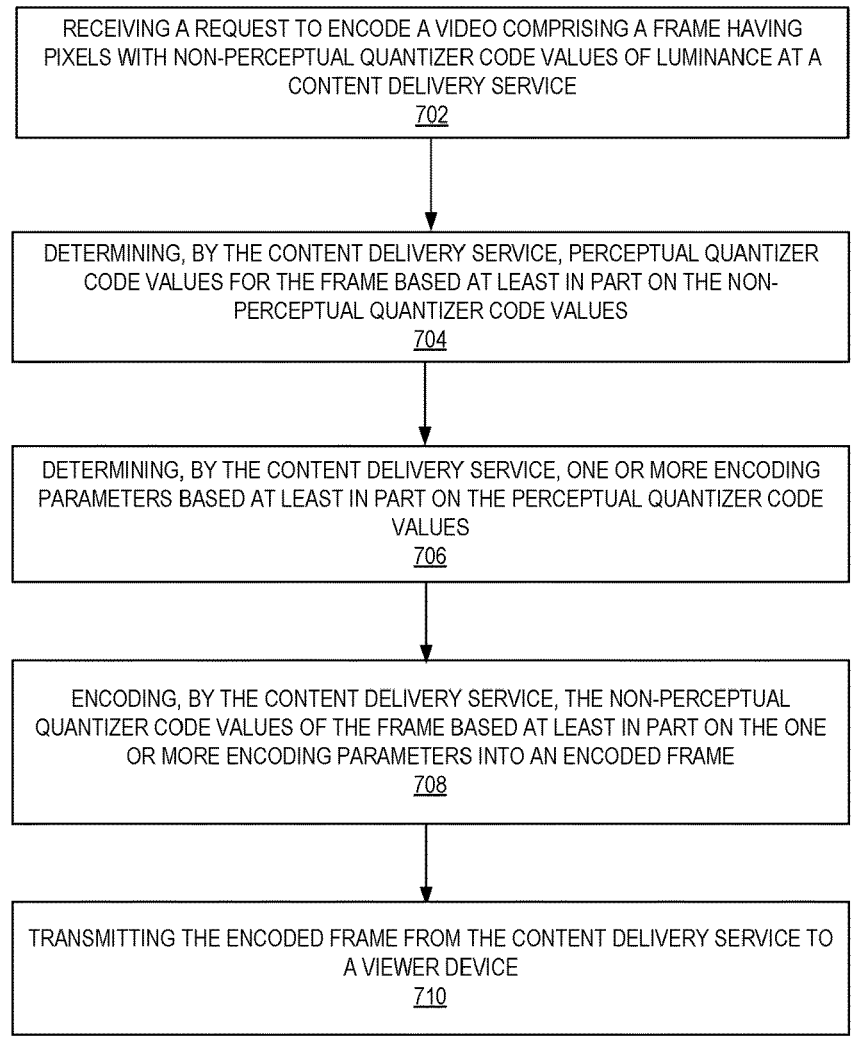
FIG. 7 is a flow diagram illustrating operations of a method for encoding a video frame according to some embodiments.

FIG. 7 is a flow diagram illustrating operations 700 of a method for encoding a video frame according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by content delivery system/service (or a component thereof) of the other figures.

The operations 700 include, at block 702, receiving a request to encode a video comprising a frame having pixels with non-perceptual quantizer code values of luminance at a content delivery service. The operations 700 further include, at block 704, determining, by the content delivery service, perceptual quantizer code values for the frame based at least in part on the non-perceptual quantizer code values. The operations 700 further include, at block 706, determining, by the content delivery service, one or more encoding parameters based at least in part on the perceptual quantizer code values. The operations 700 further include, at block 708, encoding, by the content delivery service, the non-perceptual quantizer code values of the frame based at least in part on the one or more encoding parameters into an encoded frame. The operations 700 further include, at block 710, transmitting the encoded frame from the content delivery service to a viewer device.

Exemplary environments, systems, etc. that the above may be used in are detailed below.

At least some embodiments of the disclosed technologies can be described in view of the following examples:

Example 1. A computer-implemented method comprising:
  receiving a request to encode a video comprising a frame having pixels with non-perceptual quantizer code values of luminance at a content delivery service;
  determining, by the content delivery service, perceptual quantizer code values for the frame based at least in part on the non-perceptual quantizer code values;
  determining, by the content delivery service, one or more encoding parameters based at least in part on the perceptual quantizer code values;
  encoding, by the content delivery service, the non-perceptual quantizer code values of the frame based at least in part on the one or more encoding parameters into an encoded frame; and
  transmitting the encoded frame from the content delivery service to a viewer device.

Example 2. The computer-implemented method of example 1, wherein the determining the one or more encoding parameters comprises adjusting a quantization parameter of the encoding based at least in part on the perceptual quantizer code values.

Example 3. The computer-implemented method of example 1, further comprising:
  determining corresponding brightness values from the non-perceptual quantizer code values by a non-perceptual quantizer electro-optical transfer function;
  determining the perceptual quantizer code values from the corresponding brightness values by a perceptual quantizer electro-optical transfer function; and storing a mapping of the non-perceptual quantizer code values to the perceptual quantizer code values in a data structure of the content delivery service,
wherein the determining the perceptual quantizer code values for the frame based at least in part on the non-perceptual quantizer code values comprises performing a lookup in the data structure for an input of the non-perceptual quantizer code values.

Example 4. A computer-implemented method comprising:
receiving a request to encode an image having pixels with non-perceptually uniform code values at a content delivery service;
determining, by the content delivery service, perceptually uniform code values for the image based at least in part on the non-perceptually uniform code values;
determining, by the content delivery service, one or more encoding parameters based at least in part on the perceptually uniform code values;
encoding, by the content delivery service, the non-perceptually uniform code values of the image based at least in part on the one or more encoding parameters into an encoded image; and
transmitting the encoded image from the content delivery service to a viewer device.

Example 5. The computer-implemented method of example 4, wherein the determining the one or more encoding parameters comprises adjusting a quantization parameter of the encoding based at least in part on the perceptually uniform code values.

Example 6. The computer-implemented method of example 4, further comprising:
determining corresponding brightness values (e.g., nits of light output by the modeled display) from the non-perceptually uniform code values by a non-perceptually uniform electro-optical transfer function;
determining the perceptually uniform code values from the corresponding brightness values by a perceptually uniform electro-optical transfer function; and
storing a mapping of the non-perceptually uniform code values to the perceptually uniform code values in a data structure of the content delivery service,
wherein the determining the perceptually uniform code values for the image based at least in part on the non-perceptually uniform code values comprises performing a lookup in the data structure for an input of the non-perceptually uniform code values.

Example 7. The computer-implemented method of example 6, wherein the performing the lookup in the data structure is for an input of the non-perceptually uniform code values and an input of a modeled display.

Example 8. The computer-implemented method of example 4, wherein the determining the one or more encoding parameters comprises adjusting a dithering parameter of the encoding based at least in part on the perceptually uniform code values.

Example 9. The computer-implemented method of example 4, wherein the image is a frame of a video.

Example 10. The computer-implemented method of example 4, wherein the determining the one or more encoding parameters comprises a comparison of the non-perceptually uniform code values and the perceptually uniform code values.

Example 11. The computer-implemented method of example 10, wherein the comparison generates a distortion estimation value.

Example 12. The computer-implemented method of example 11, wherein the determining the one or more encoding parameters comprises determining different quantization parameters of the encoding for different blocks of the image based at least in part on the distortion estimation value.

Example 13. The computer-implemented method of example 11, wherein the determining the one or more encoding parameters comprises determining different dithering parameters of the encoding for different blocks of the image based at least in part on the distortion estimation value.

Example 14. The computer-implemented method of example 4, wherein the encoding is a non-perceptually uniform (e.g., SDR) encoding.

Example 15. A system comprising:
a content data store to store an image; and
one or more electronic devices to implement a content delivery service, the content delivery service including instructions that upon execution cause the content delivery service to perform operations comprising:
receiving a request to encode the image having pixels with non-perceptually uniform code values at the content delivery service,
determining, by the content delivery service, perceptually uniform code values for the image based at least in part on the non-perceptually uniform code values,
determining, by the content delivery service, one or more encoding parameters based at least in part on the perceptually uniform code values,
encoding, by the content delivery service, the non-perceptually uniform code values of the image based at least in part on the one or more encoding parameters into an encoded image, and
transmitting the encoded image from the content delivery service to a viewer device.

Example 16. The system of example 15, wherein the instructions upon execution cause the content delivery service to perform operations wherein the determining the one or more encoding parameters comprises adjusting a quantization parameter of the encoding based at least in part on the perceptually uniform code values.

Example 17. The system of example 15, wherein the instructions upon execution cause the content delivery service to perform operations further comprising:
determining corresponding brightness values from the non-perceptually uniform code values by a non-perceptually uniform electro-optical transfer function;
determining the perceptually uniform code values from the corresponding brightness values by a perceptually uniform electro-optical transfer function; and
storing a mapping of the non-perceptually uniform code values to the perceptually uniform code values in a data structure of the content delivery service,
wherein the determining the perceptually uniform code values for the image based at least in part on the non-perceptually uniform code values comprises performing a lookup in the data structure for an input of the non-perceptually uniform code values.

Example 18. The system of example 15, wherein the instructions upon execution cause the content delivery service to perform operations wherein the determining the one or more encoding parameters comprises a comparison of the non-perceptually uniform code values and the perceptually uniform code values.

Example 19. The system of example 18, wherein the instructions upon execution cause the content delivery service to perform operations wherein the comparison generates a distortion estimation value.

Example 20. The system of example 15, wherein the encoding is a non-perceptually uniform encoding.

Figure 8:
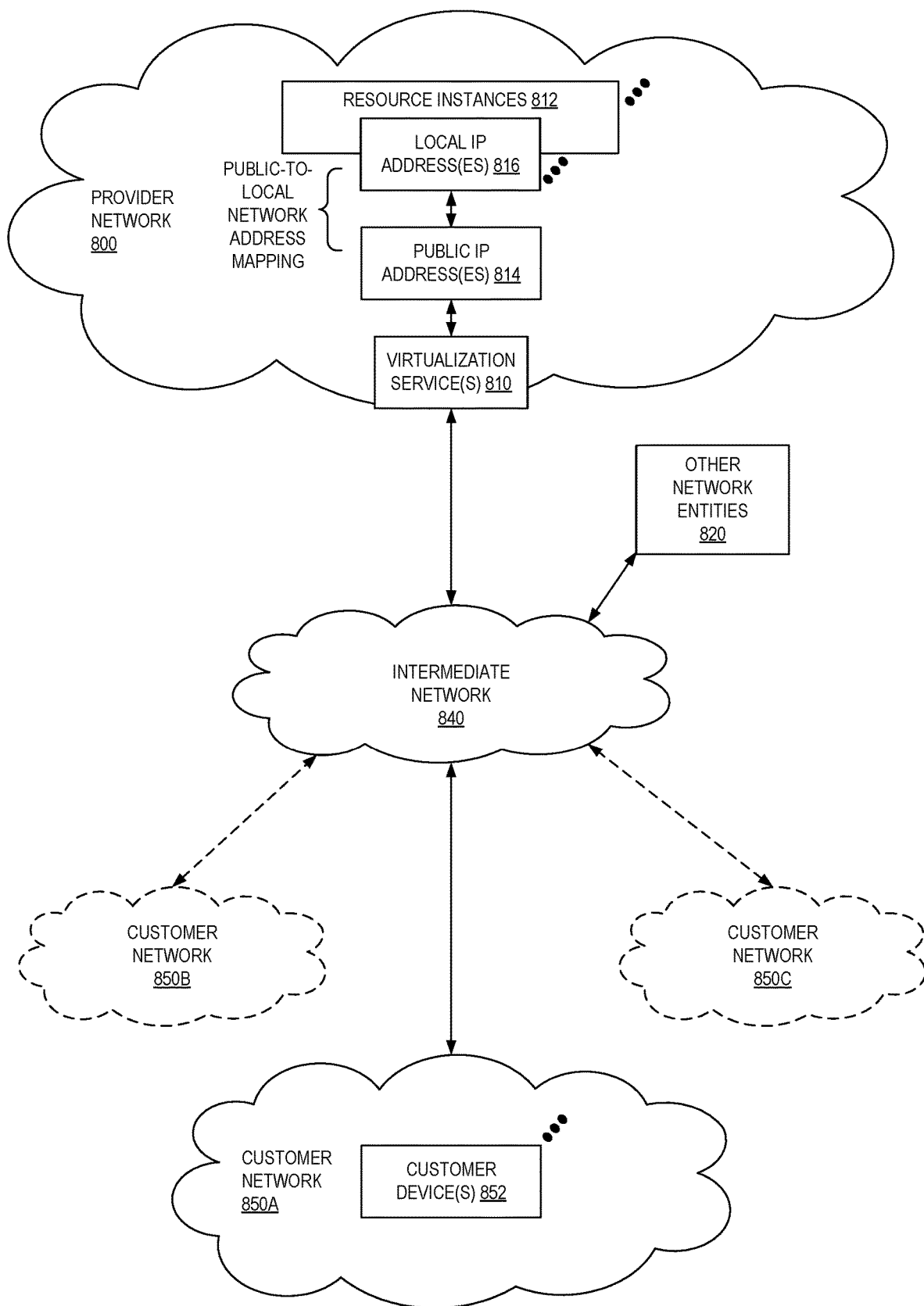
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
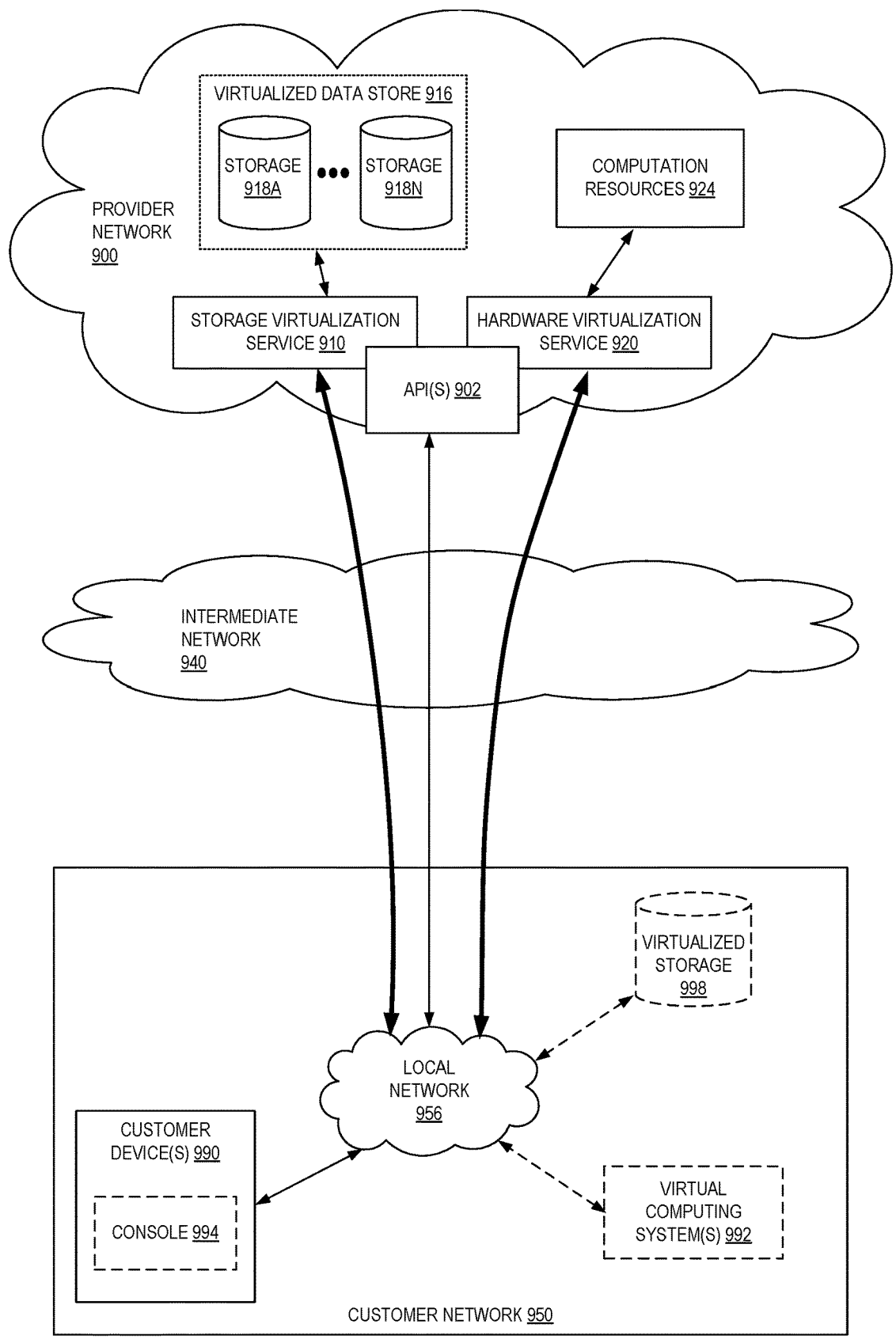
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
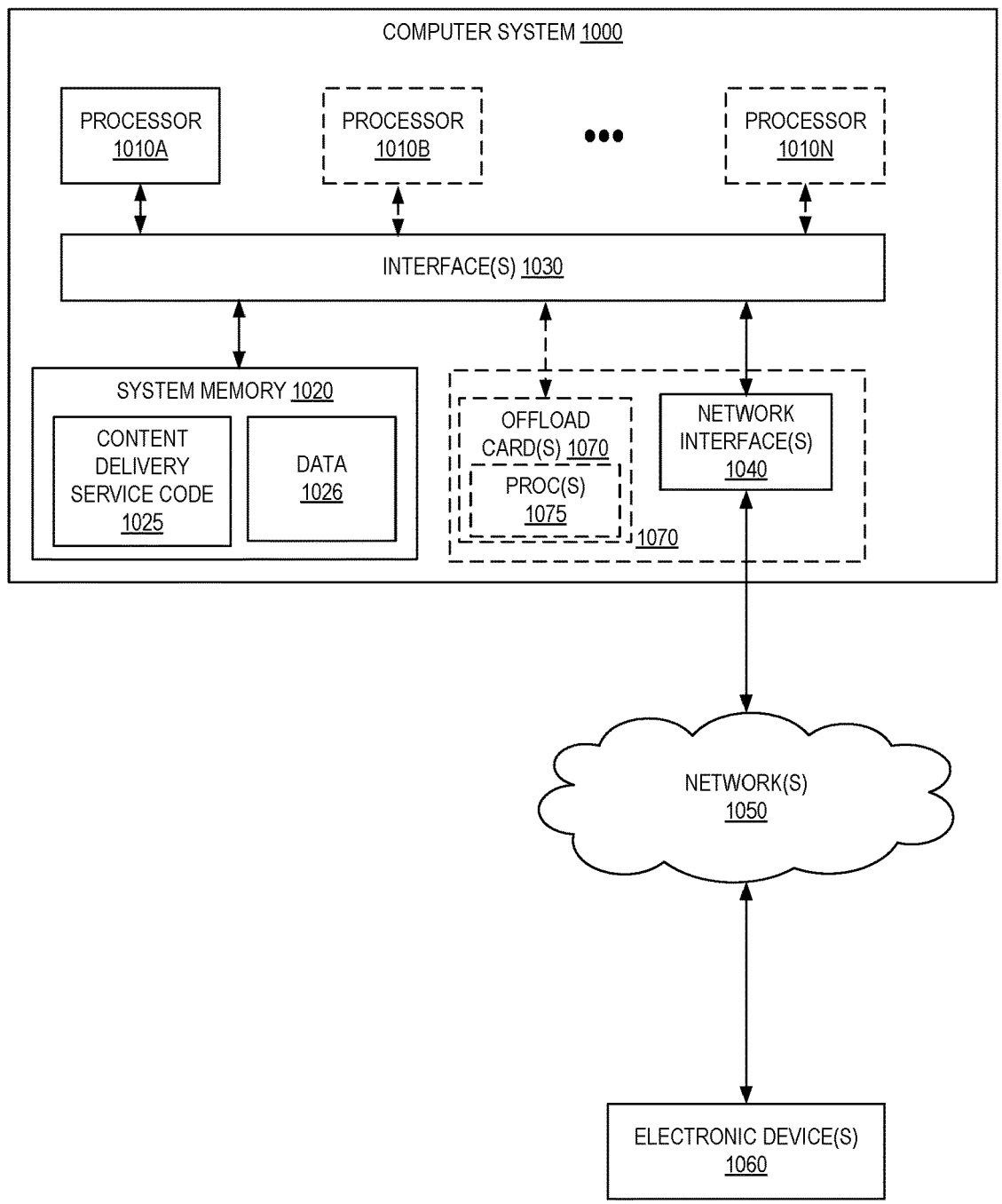
FIG. 10 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as content delivery service code 1025 (e.g., executable to implement, in whole or in part, the content delivery service 102) and data 1026.

In certain embodiments, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
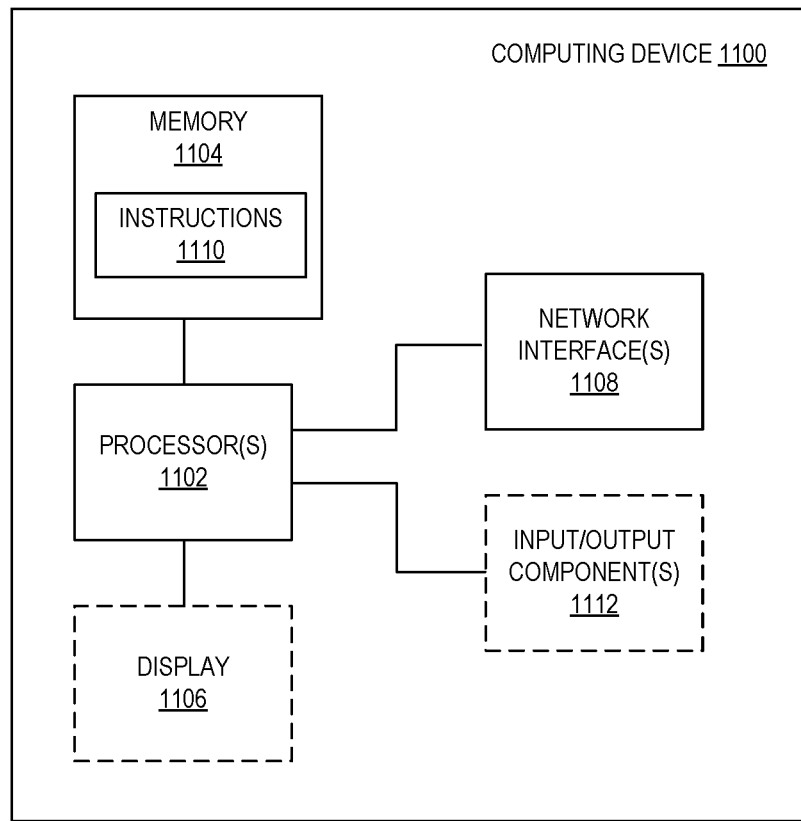
FIG. 11 illustrates a logical arrangement of a set of general components of an exemplary computing device that can be utilized in accordance with various embodiments.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 12:
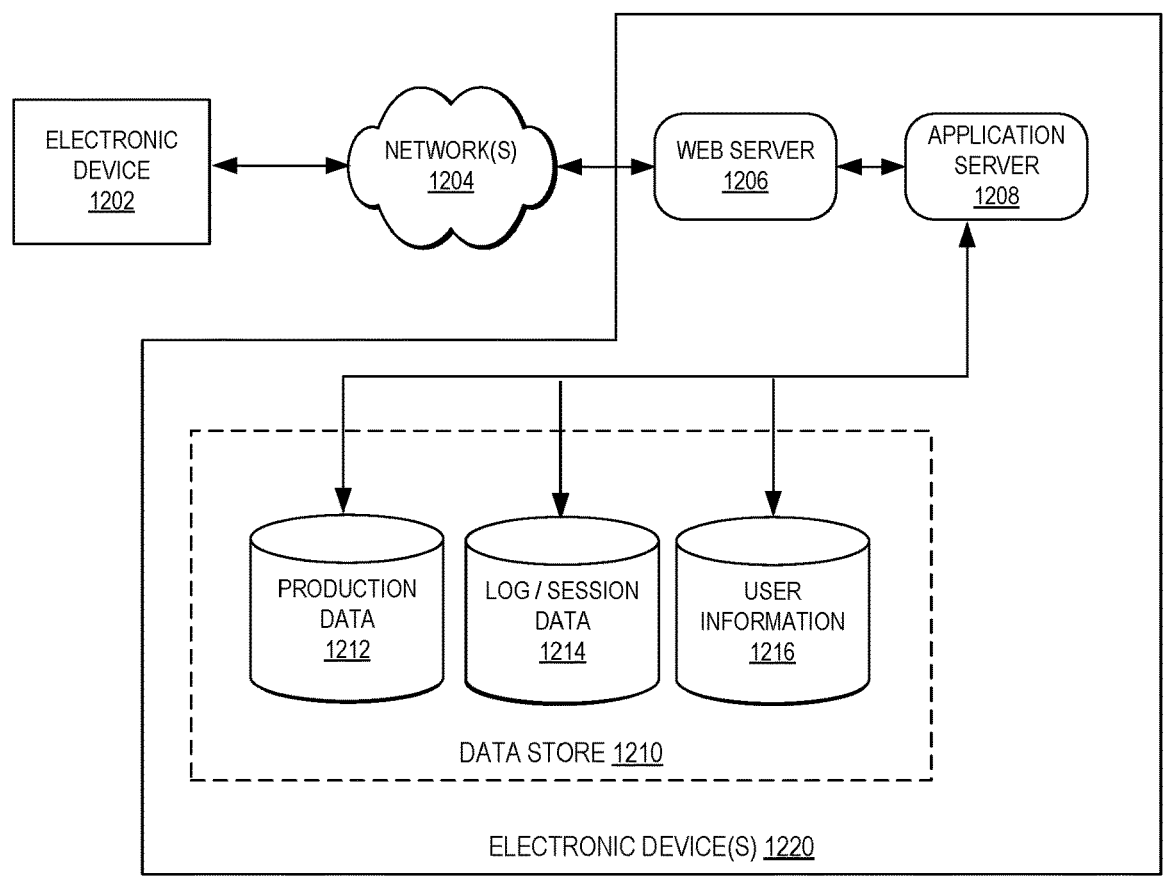
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various embodiments. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIF S), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to encode a video comprising a frame having pixels with non-perceptual quantizer code values of luminance at a content delivery service;
   determining, by the content delivery service, perceptual quantizer code values for the frame based at least in part on the non-perceptual quantizer code values;
   determining, by the content delivery service, one or more encoding parameters based at least in part on the perceptual quantizer code values;
   encoding, by the content delivery service, the non-perceptual quantizer code values of the frame based at least in part on the one or more encoding parameters into an encoded frame; and
   transmitting the encoded frame from the content delivery service to a viewer device.

2. The computer-implemented method of claim 1, wherein the determining the one or more encoding parameters comprises adjusting a quantization parameter of the encoding based at least in part on the perceptual quantizer code values.

3. The computer-implemented method of claim 1, further comprising:
   determining corresponding brightness values from the non-perceptual quantizer code values by a non-perceptual quantizer electro-optical transfer function;
   determining the perceptual quantizer code values from the corresponding brightness values by a perceptual quantizer electro-optical transfer function; and
   storing a mapping of the non-perceptual quantizer code values to the perceptual quantizer code values in a data structure of the content delivery service,
   wherein the determining the perceptual quantizer code values for the frame based at least in part on the non-perceptual quantizer code values comprises performing a lookup in the data structure for an input of the non-perceptual quantizer code values.

4. A computer-implemented method comprising:
   receiving a request to encode an image having pixels with non-perceptually uniform code values at a content delivery service;
   determining, by the content delivery service, perceptually uniform code values for the image based at least in part on the non-perceptually uniform code values;

determining, by the content delivery service, one or more encoding parameters based at least in part on the perceptually uniform code values;

encoding, by the content delivery service, the non-perceptually uniform code values of the image based at least in part on the one or more encoding parameters into an encoded image; and transmitting the encoded image from the content delivery service to a viewer device.

5. The computer-implemented method of claim 4, wherein the determining the one or more encoding parameters comprises adjusting a quantization parameter of the encoding based at least in part on the perceptually uniform code values.

6. The computer-implemented method of claim 4, further comprising:

determining corresponding brightness values from the non-perceptually uniform code values by a non-perceptually uniform electro-optical transfer function;

determining the perceptually uniform code values from the corresponding brightness values by a perceptually uniform electro-optical transfer function; and storing a mapping of the non-perceptually uniform code values to the perceptually uniform code values in a data structure of the content delivery service, wherein the determining the perceptually uniform code values for the image based at least in part on the non-perceptually uniform code values comprises performing a lookup in the data structure for an input of the non-perceptually uniform code values.

7. The computer-implemented method of claim 6, wherein the performing the lookup in the data structure is for an input of the non-perceptually uniform code values and an input of a modeled display.

8. The computer-implemented method of claim 4, wherein the determining the one or more encoding parameters comprises adjusting a dithering parameter of the encoding based at least in part on the perceptually uniform code values.

9. The computer-implemented method of claim 4, wherein the image is a frame of a video.

10. The computer-implemented method of claim 4, wherein the determining the one or more encoding parameters comprises a comparison of the non-perceptually uniform code values and the perceptually uniform code values.

11. The computer-implemented method of claim 10, wherein the comparison generates a distortion estimation value.

12. The computer-implemented method of claim 11, wherein the determining the one or more encoding parameters comprises determining different quantization parameters of the encoding for different blocks of the image based at least in part on the distortion estimation value.

13. The computer-implemented method of claim 11, wherein the determining the one or more encoding parameters comprises determining different dithering parameters of the encoding for different blocks of the image based at least in part on the distortion estimation value.

14. The computer-implemented method of claim 4, wherein the encoding is a non-perceptually uniform encoding.

15. A system comprising:

a content data store to store an image; and one or more electronic devices to implement a content delivery service, the content delivery service including instructions that upon execution cause the content delivery service to perform operations comprising:

receiving a request to encode the image having pixels with non-perceptually uniform code values at the content delivery service, determining, by the content delivery service, perceptually uniform code values for the image based at least in part on the non-perceptually uniform code values, determining, by the content delivery service, one or more encoding parameters based at least in part on the perceptually uniform code values, encoding, by the content delivery service, the non-perceptually uniform code values of the image based at least in part on the one or more encoding parameters into an encoded image, and transmitting the encoded image from the content delivery service to a viewer device.

16. The system of claim 15, wherein the instructions upon execution cause the content delivery service to perform operations wherein the determining the one or more encoding parameters comprises adjusting a quantization parameter of the encoding based at least in part on the perceptually uniform code values.

17. The system of claim 15, wherein the instructions upon execution cause the content delivery service to perform operations further comprising:

determining corresponding brightness values from the non-perceptually uniform code values by a non-perceptually uniform electro-optical transfer function;

determining the perceptually uniform code values from the corresponding brightness values by a perceptually uniform electro-optical transfer function; and storing a mapping of the non-perceptually uniform code values to the perceptually uniform code values in a data structure of the content delivery service, wherein the determining the perceptually uniform code values for the image based at least in part on the non-perceptually uniform code values comprises performing a lookup in the data structure for an input of the non-perceptually uniform code values.

18. The system of claim 15, wherein the instructions upon execution cause the content delivery service to perform operations wherein the determining the one or more encoding parameters comprises a comparison of the non-perceptually uniform code values and the perceptually uniform code values.

19. The system of claim 18, wherein the instructions upon execution cause the content delivery service to perform operations wherein the comparison generates a distortion estimation value.

20. The system of claim 15, wherein the encoding is a non-perceptually uniform encoding.

* * * * *